(12) United States Patent
Aryanfar et al.

(10) Patent No.: US 9,287,616 B2
(45) Date of Patent: Mar. 15, 2016

(54) CALIBRATING A RETRO-DIRECTIVE ARRAY FOR AN ASYMMETRIC WIRELESS LINK

(75) Inventors: Farshid Aryanfar, Sunnyvale, CA (US); Jihong Ren, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 125 days.

(21) Appl. No.: 14/240,405

(22) PCT Filed: Jul. 20, 2012

(86) PCT No.: PCT/US2012/047751
§ 371 (c)(1),
(2), (4) Date: Feb. 24, 2014

(87) PCT Pub. No.: WO2013/028296
PCT Pub. Date: Feb. 28, 2013

(65) Prior Publication Data
US 2014/0210683 A1 Jul. 31, 2014

Related U.S. Application Data

(60) Provisional application No. 61/527,044, filed on Aug. 24, 2011.

(51) Int. Cl.
*H01Q 1/50* (2006.01)
*H01Q 1/24* (2006.01)
(Continued)

(52) U.S. Cl.
CPC ............... *H01Q 1/50* (2013.01); *H01Q 1/241* (2013.01); *H01Q 3/267* (2013.01); *H01Q 3/2647* (2013.01); *H04B 17/13* (2015.01); *H04B 17/12* (2015.01); *H04B 17/14* (2015.01)

(58) Field of Classification Search
CPC .......... H01Q 1/50; H01Q 1/241; H01Q 3/267; H04B 17/12; H04B 17/13; H04B 17/14
USPC ................................... 343/700 MS, 850, 872
See application file for complete search history.

(56) References Cited

U.S. PATENT DOCUMENTS 6,346,910 B1    2/2002  Ito
7,184,492 B2    2/2007  Dent (Continued)

FOREIGN PATENT DOCUMENTS

EP    2173010 A1    4/2010

OTHER PUBLICATIONS

PCT International Preliminary Report on Patentability dated Mar. 6, 2014 (Chapter I) in International Application No. PCT/US2012/047751. 6 pages.

(Continued)

*Primary Examiner* — Lam T Mai
(74) *Attorney, Agent, or Firm* — Fenwick & West LLP

(57) ABSTRACT

The disclosed embodiments relate to a technique for calibrating a retro-directive array. During the calibration process, the system measures a gain $g_1$ through a first pair of antennas in the retro-directive array. Next, the system measures a gain $g_2$ through a second pair of antennas in the retro-directive array. The system then simultaneously measures a combined gain $G_{1,2}$ through the first and second pairs of antennas in the retro-directive array. If $G_{1,2}$ is less than $g_1+g_2$ by more than a threshold value, the system calibrates a phase relationship between the first and second pairs of antennas.

19 Claims, 7 Drawing Sheets

(51) Int. Cl.
*H01Q 3/26* (2006.01)
*H04B 17/13* (2015.01)
*H04B 17/12* (2015.01)
*H04B 17/14* (2015.01)

(56) References Cited

U.S. PATENT DOCUMENTS

| | | | |
|---|---|---|---|
| 8,102,313 B2 * | 1/2012 | Guenther | H01Q 1/28 342/370 |
| 8,643,536 B2 * | 2/2014 | Cavirani | G01S 7/024 342/118 |
| 8,767,615 B2 * | 7/2014 | Chang | G01S 13/9303 370/316 |
| 9,026,040 B2 * | 5/2015 | Aryanfar | H04B 7/0671 455/15 |
| 2006/0240784 A1 | 10/2006 | Naguib et al. | |
| 2006/0262013 A1 | 11/2006 | Shiroma et al. | |
| 2008/0261534 A1 | 10/2008 | Wang et al. | |
| 2010/0026561 A1 | 2/2010 | Takano et al. | |
| 2010/0093282 A1 | 4/2010 | Martikkala et al. | |
| 2010/0245158 A1 | 9/2010 | Scott | |
| 2010/0253572 A1 | 10/2010 | Hardacker et al. | |

OTHER PUBLICATIONS

PCT International Search Report and Written Opinion dated Jan. 28, 2013 in International Application No. PCT/US2012/047751. 9 pages.

* cited by examiner

12;
CALIBRATING A RETRO-DIRECTIVE ARRAY FOR AN ASYMMETRIC WIRELESS LINK

BACKGROUND

1. Field

The disclosed embodiments generally relate to techniques for calibrating antenna arrays. More specifically, the disclosed embodiments relate to a method and apparatus for calibrating a retro-directive antenna array to support an asymmetric wireless link.

2. Related Art

In wireless communication systems, performance can be improved by using multiple antennas to directionally transmit and receive electromagnetic signals. For example, a phased-array antenna system comprising multiple antenna elements and associated signal-processing circuitry can be used to directionally transmit and receive an electromagnetic beam. In such systems, the direction of the beam can be steered by adjusting the phase relationships between the signals associated with the constituent antenna elements. In another example, tracking systems based on phase arrays have been used for many years in military radar applications.

Recent technological developments are beginning to make it practical to apply these technologies to asymmetric wireless consumer applications, for example to track a controller device from a game console. In contrast to military radar applications, the targets for consumer applications can cooperate to ease the tracking process. However, the only practical frequency band for such applications is in the millimeter-wavelength range, which facilitates fitting a small antenna array with a reasonable number of elements to provide fine beam resolution inside a portable device, such as a game controller.

Unfortunately, manufacturing process variations in such systems can cause signals to have both phase and magnitude errors. Moreover, at higher frequencies, these errors are more pronounced because the absolute values of circuit parameters such as inductance (L) and capacitance (C) scale with frequency while the associated variations do not. Furthermore, in systems that use antenna arrays, these errors are more significant because the mismatch between circuit elements can additionally reduce system performance.

DETAILED DESCRIPTION

Overview

Figure 1A:
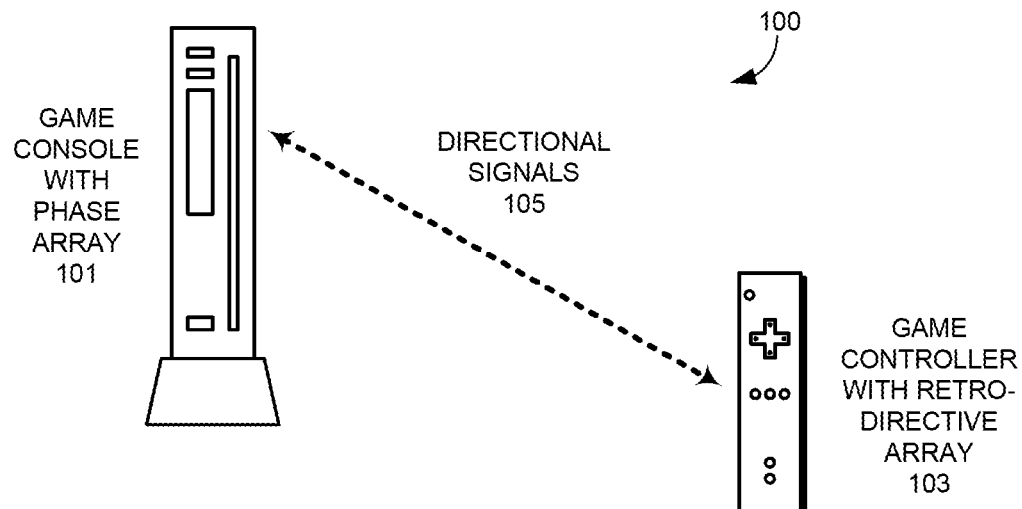
FIG. 1A illustrates a game console communicating with a game controller in accordance with the disclosed embodiments.
Figure 1B:
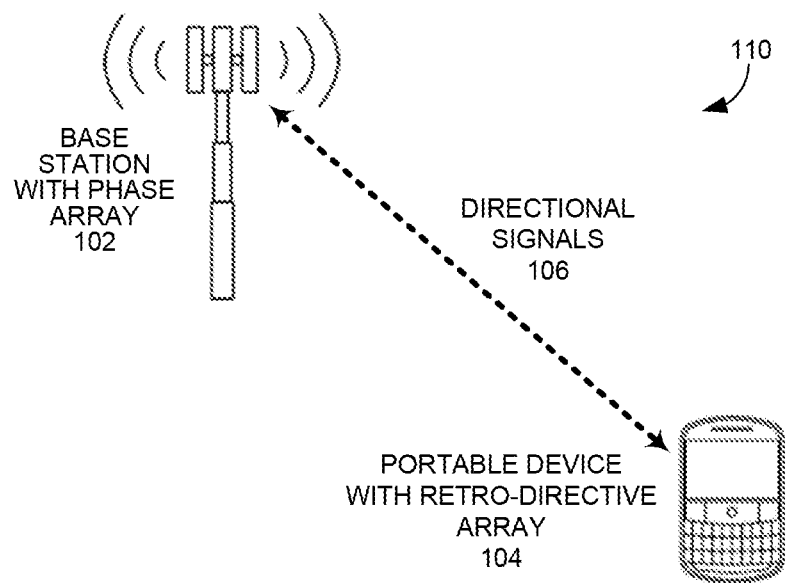
FIG. 1B illustrates a portable device communicating with a base station in accordance with the disclosed embodiments.

This disclosure presents a technique for calibrating an asymmetric wireless link. This technique calibrates both sides of the link with minimal computational overhead. It also requires no additional measurements on the remote/controller side to calibrate the remote array, and only a dummy transceiver on the console side to calibrate the console array. An exemplary embodiment of such a system 100 appears in FIG. 1A, which illustrates a video game console 101 and an associated game controller 103. This video game console 101 includes a phase array that transmits and receives directional signals 105 to a corresponding retro-directive array in the game controller 103. (Note that a "directional signal" is a signal which is transmitted through a directional antenna which focuses the energy of the signal in one or more specific directions instead of radiating the signal in all directions.) FIG. 1B illustrates another exemplary system 110 comprising a base station 102 which includes a phase array that transmits and receives directional signals 106 and a portable device 104, such as a smartphone, that includes a retro-directive array.

Calibrating the Controller-Side Antenna Array

Figure 2A:
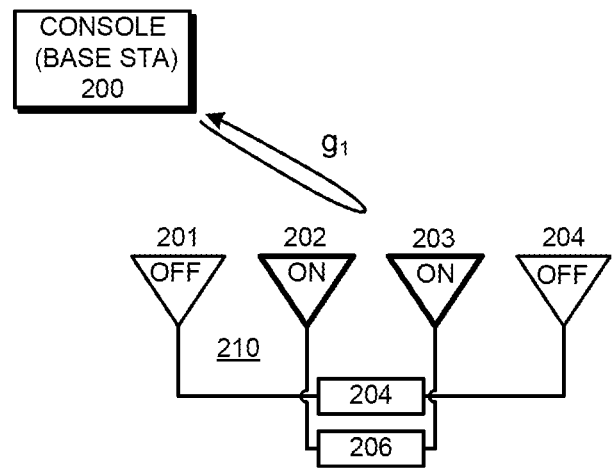
FIG. 2A illustrates the process of measuring a loopback gain $g_1$ for a first pair of antennas in a retro-directive array in accordance with the disclosed embodiments.
Figure 2B:
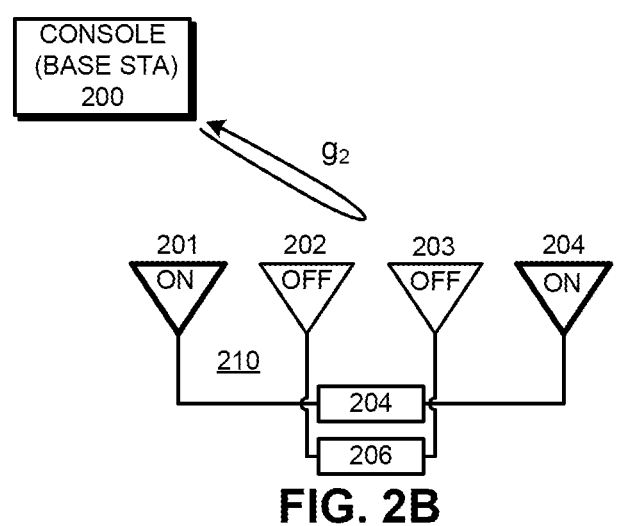
FIG. 2B illustrates the process of measuring a loopback gain $g_2$ for a second pair of antennas in the retro-directive array in accordance with the disclosed embodiments.
Figure 2C:
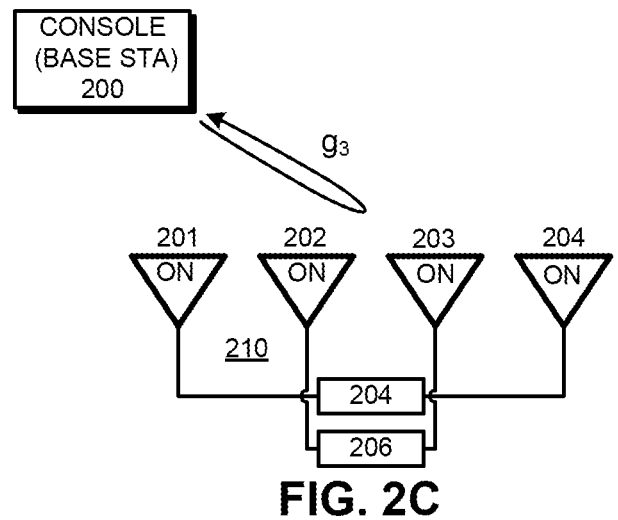
FIG. 2C illustrates the process of measuring a combined loopback gain $G_{1,2}$ for the first and second pairs of antennas in accordance with the disclosed embodiments.

FIGS. 2A-2C illustrate a console (base station) 200 communicating with a controller-side retro-directive array 210 containing four antennas 201-204 in accordance with the disclosed embodiments. Note that retro-directive array 210 is presented as a simple example that has only four antennas 201-204. In general, a retro-directive array can have more or fewer antennas placed in one or more dimensions.

In FIGS. 2A-2C, a first pair of antennas (201, 204) is coupled together through circuitry 204, and a second pair of antennas (202, 203) is coupled together through circuitry 206. To calibrate the controller side of the asymmetric wireless link, each pair of antennas in retro-directive array 210 is turned on one at a time, and the loopback gains ($g_1$, $g_2$ ...) are measured separately. For example, in FIG. 2A, the second antenna pair (202, 203) is active while the first antenna pair (201, 204) is turned off. Then, while the second antenna pair (202, 203) is active, console 200 measures the associated loopback gain $g_1$. Next, as is illustrated in FIG. 2B, the first antenna pair (201, 204) is active while the second antenna pair (202, 203) is turned off, and console 200 measures the associated loopback gain $g_2$.

Next, as is illustrated in FIG. 2C, both the first and second antenna pairs (201, 204) and (202, 203) are simultaneously turned on, and console 200 measures the combined loopback gain $G_{1,2}$. If $G_{1,2}$ is substantially smaller than $g_1+g_2$, the fixed delay between two antenna pairs is adjusted, and measurement is repeated until $G_{1,2} \approx g_1+g_2$. A similar procedure is repeated for all other antenna pairs in the retro-directive array.

During the above-described process, to minimize the number of iterations required to arrive at optimum delay settings, multiple tones are transmitted simultaneously and loopback gains are measured for the individual tones. As a result of these measurements, the delay offsets between antenna pairs are measured and are then used to set the optimum values in delay blocks within the remote retro-directive array.

Mathematically, what is measured is a combined gain $G_{1,2}$ which can be written as follows:

$$G_{1,2} = g_1 + g_2 \cos(\Delta\phi) \to \Delta\phi +/- n\pi. \quad (1)$$

Due to the periodic nature of the cosine function, it is not possible to extract the unwrapped value of the phase difference between the two antenna pairs by using a single measurement. When multiple tones with a known spacing are used and the phase slope is extracted, the unwrapped phase difference and consequently the required matching delay can be found easily. By assuming n=0 in equation (1), the delay between two antenna pairs can be written as $\Delta t=(\Delta\phi_1/\omega_1)$ and the estimated $\Delta\phi_2$ for $\omega_2$ can then be estimated using:

$$\Delta\phi_{2e} = (\omega_2/\omega_1)\cdot\Delta\phi_1. \quad (2)$$

By comparing the estimated and measured values for $\Delta\phi_2$, the actual value for n can be then calculated and used to determine the actual offset delay between the two antenna pairs. Furthermore, a multi-tone measurement is performed if a frequency selective phase mismatch is expected between array elements.

Calibration Adjustments

A number of different mechanisms can be used within the retro-directive array to calibrate the phase relationships between two pairs of antennas. These phase relationships can be adjusted in a number of ways, such as by calibrating (1) delay elements, (2) phase mixers or (3) local oscillators associated with the retro-directive array.

Figure 3A:
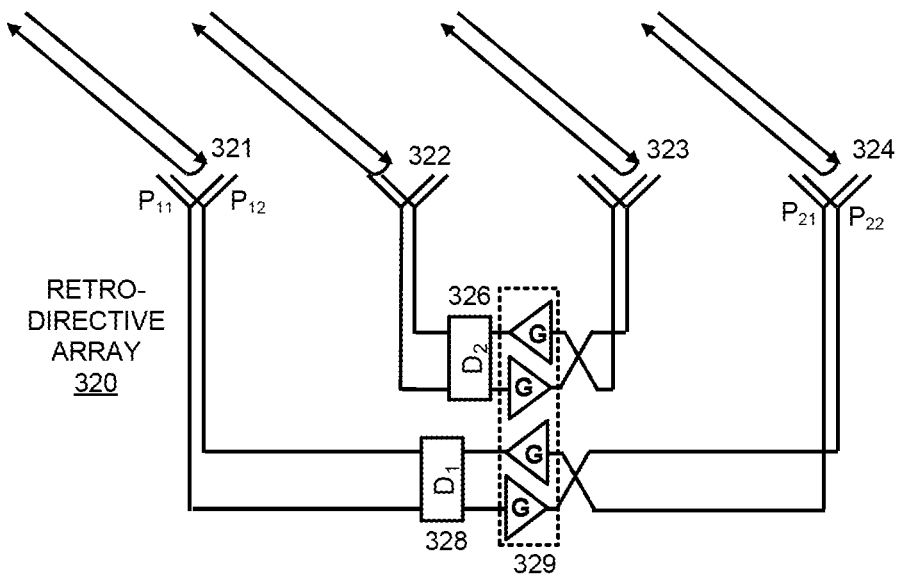
FIG. 3A illustrates a retro-directive array with tunable delay elements $D_1$ and $D_2$ in accordance with the disclosed embodiments.

FIG. 3A illustrates a retro-directive array 320 with tunable delay elements $D_1$ 328 and $D_2$ 326 in accordance with the disclosed embodiments. Note that the exemplary retro-directive array 320 illustrated in FIG. 3A makes use of orthogonal signal polarizations. During operation, a transmitted signal with a first polarization is received at a retro-directive array 320, which sends back a return signal with a different second polarization. During this process, retro-directive array 320 receives signals through antenna elements 321-324 and amplifies the signals using gain elements 329 before returning the signals to the transmitter through antenna elements 321-324. (Note that antenna 321 is comprised of spatially orthogonal antenna elements $P_{11}$ and $P_{12}$, and antenna 324 is comprised of spatially orthogonal antenna elements $P_{21}$ and $P_{22}$.) Note that the polarization of the signals is changed from the first polarization to the second orthogonal polarization. Moreover, delay elements $D_1$ 328 and $D_2$ 326 are used to fine-tune the delays between the received and transmitted signals to ensure that the return signal is accurately steered back to the transmitter.

Figure 3B:
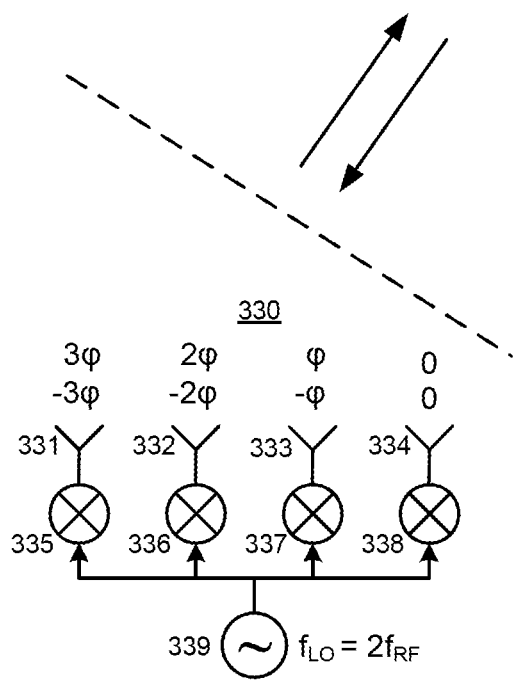
FIG. 3B illustrates a retro-directive array with tunable phase mixers and a tunable delay element in accordance with the disclosed embodiments.

FIG. 3B illustrates a retro-directive array 330 with tunable phase mixers 335-338 and a tunable local oscillator 339 in accordance with the disclosed embodiments. During operation, each of the antennas 331-334 in retro-directive array 330 receives a transmitted signal. The geometry of retro-directive array 330 and the direction of the transmitted signals cause different phase offsets ($3\phi$, $2\phi$, $\phi$, 0) at each of the antennas 331-334. In response, retro-directive array 330 generates a return signal, wherein each antenna has a corresponding phase offset ($-3\phi$, $-2\phi$, $-\phi$, 0). This causes the return signal to be directed back to the transmitter. These phase offsets ($-3\phi$, $-2\phi$, $-\phi$, 0) are generated using a set of phase mixers 335-338 which mix incoming signal with a output tone/signal from a local oscillator 339. During this mixing process, the phase relationship between specific pairs of antennas can be adjusting by calibrating phase mixers 335-338 and/or local oscillator 339.

Multiple Antenna Elements per Signal Pathway

Figure 4A:
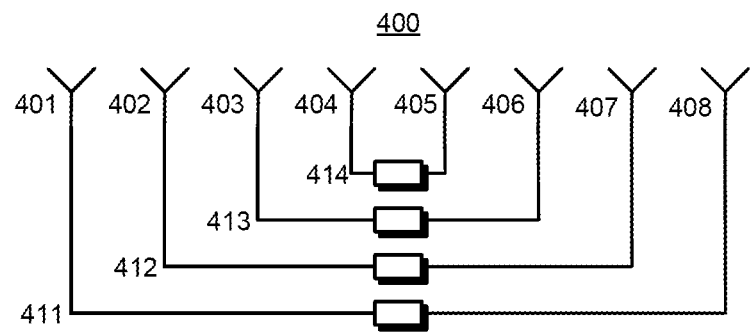
FIG. 4A illustrates a retro-directive array with pairs of antennas connected by loopback signal paths in accordance with the disclosed embodiments.
Figure 4B:
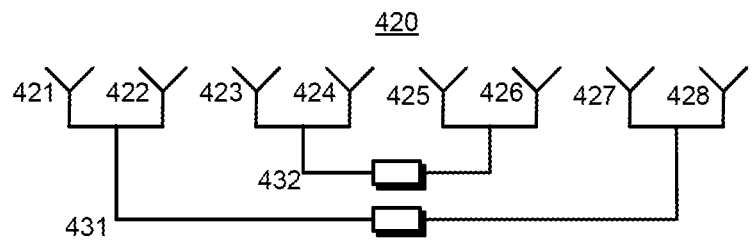
FIG. 4B illustrates a retro-directive array wherein pairs of antenna elements share a loopback signal path in accordance with the disclosed embodiments.
Figure 4C:
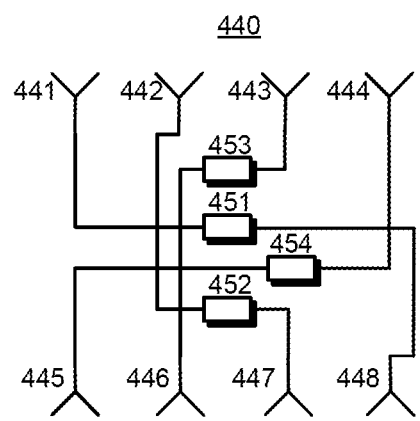
FIG. 4C illustrates a 4-by-2 retro-directive array in which pairs of antenna elements each share respective loopback signal paths in accordance with the disclosed embodiments.

Although this disclosure describes pairs of antennas which are connected via a signal path in the retro-directive array, in some embodiments two sets of antenna elements (each containing two or more antenna elements) are connected by a single signal pathway. In this case, there is a calibration operation for each signal pathway (instead of for each pair of antenna elements). More specifically, FIG. 4A illustrates a conventional retro-directive array 400, wherein pairs of antennas (401, 408), (402, 407), (403, 406) and (404, 405) are connected by associated loopback signal paths 411, 412, 413 and 414, respectively. In contrast, FIG. 4B illustrates a retro-directive array 420 wherein pairs of antenna elements (421, 422), (423, 424), (425, 426) and (427, 428) share loopback signal paths 431 and 432. In particular, pairs of antenna elements (421, 422) and (427, 428) are connected together through signal path 431, and pairs of antenna elements (423, 424) and (425, 426) are connected together through signal path 432. In another case, FIG. 4C illustrates a 4-by-2 retro-directive array 440 wherein pairs of antenna elements (441, 448), (442, 447), (443, 446), and (444, 445) each share respective loopback signal paths 451, 452, 453, and 454.

Process of Calibrating a Retro-Directive Array

Figure 5:
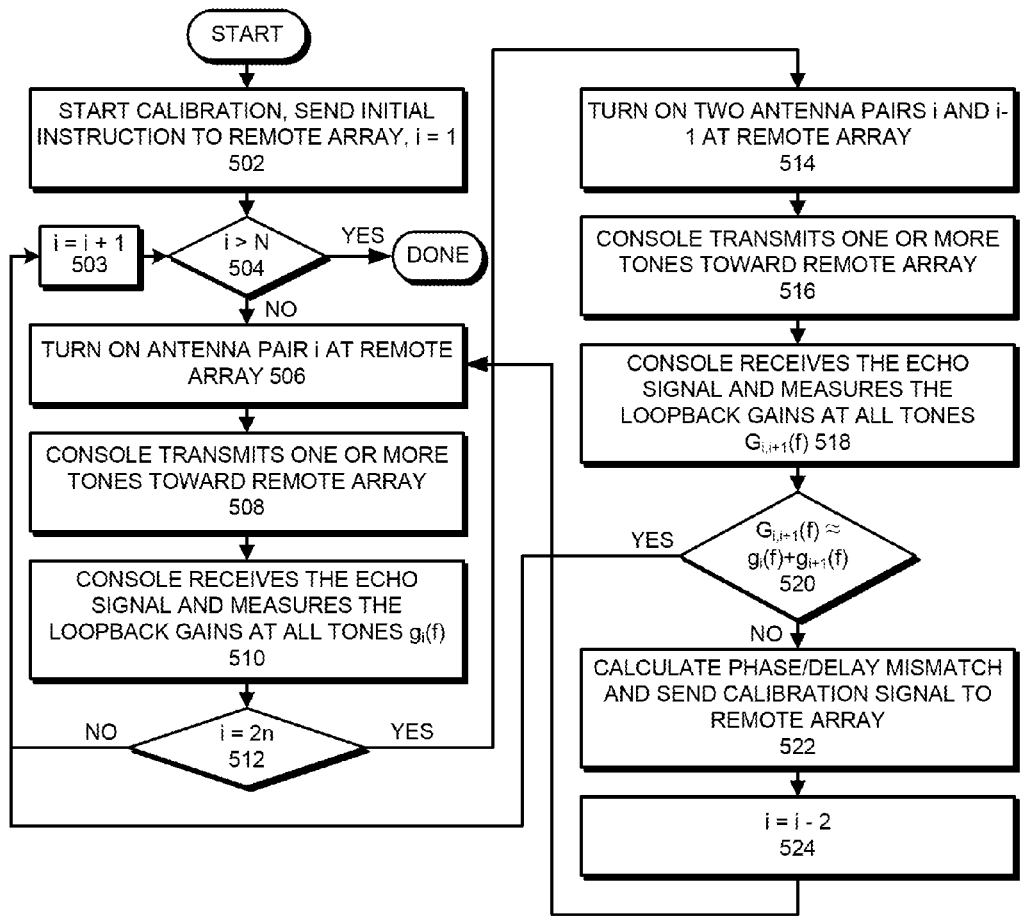
FIG. 5 presents a flow chart illustrating the process of calibrating a retro-directive array in accordance with the disclosed embodiments.

FIG. 5 presents a flow chart illustrating the process of calibrating a retro-directive array in accordance with the disclosed embodiments. The calibration process starts when the console sends an initial calibration instruction to the remote retro-directive array (step 502). This initial calibration instruction causes the remote array to enter a calibration mode and also sets the counter variable i=1. Next, the system determines if i>N (step 504). If so, the calibration process is complete. Otherwise, the system activates a pair of antennas i at the remote array (step 506). This activation process involves the console sending an instruction to the remote array, wherein the instruction causes the remote array to activate the pair of antennas i while the other antennas in the retro-directive array are inactive. Next, the console transmits one or more tones toward the remote array (step 508). The remote array receives these tones and passes them through loopback circuitry which causes the tones to be echoed back to the console. Then, the console receives the echo signal and measures the respective loopback gains $g_i(f)$ for all of the tones (step 510). The system then determines if i is even (i=2N) (step 512). If not, the system increments i (step 503) and returns to step 504 to repeat the process.

Otherwise, if i is even at step 512, the system turns on two pairs of antennas i and i+1 while the other antennas in the remote array remain inactive (step 514). Next, the console transmits one or more tones toward the remote array (step 516). The remote array receives these tones and passes them through the loopback circuitry for each pair of antennas i and i+1, which causes the tones to be echoed back to the console. Then, the console receives the echo signal and measures the combined loopback gains $G_{i,i+1}(f)$ for all of the tones (step 518).

Next, the system determines whether the combined loopback gains $G_{i,i+1}(f)$ are approximately equal to the sum of the individual loopback gains $g_i(f)+g_{i+1}(f)$ for each pair of antennas i and i+1 (step 520). This can involve determining whether the combined gain $G_{i,i+1}(f)$ falls within a threshold value of the sum of the individual loopback gains $g_i(f)+g_{i+1}(f)$. If so, the system increments i (step 503) and returns to step 504 to repeat the process. Otherwise, the system calculates the phase/delay mismatch and sends a corresponding calibration signal to the remote array (step 522). This calibration signal causes the remote array to adjust the relative phase between the two pairs of antenna elements, which acts to calibrate the phase relationship between the pairs of antenna elements. (Note that while calibrating two antenna pairs, it is possible to leave the phase of one antenna pair unchanged, and to adjust the phase of the other antenna pair. The choice of which antenna pair to adjust can be based upon how the adjustment affects the remaining adjustment range for each antenna pair. Ideally, the system will adjust the antenna pair which will have the most remaining range for adjustment.) Next, the system decreases the counter variable i by 2 (step 524) and returns to step 506 to repeat the process for antenna pairs i and i+1.

Note that the process illustrated in FIG. 5 causes successive pairs of antennas to be calibrated. Then, the calibrated pairs are calibrated with each other to form larger calibrated groups, and these larger calibrated groups are calibrated with each other until the entire array is calibrated. More specifically, the flow chart in FIG. 5 illustrates a basic calibration process between pairs of individual antennas, where each of the individual antennas can comprise more than one antenna element as shown in FIG. 4B. In the most detailed case, to ensure matching between all of the antennas in the array, the procedure continues by comparing the gains of sets of 4 antennas (pairs of pairs). This involves turning ON one "pair of pairs" (2×2=4) at once and comparing the loop back gain for a first and second set of 4 antennas versus the case where all 8 antennas are turned ON. This binary technique for performing loop back gain measurements continues until there are 4 quadrants of antenna sets remaining in the whole array. At this point, the calibration between these 4 sets will be done in same way and will be last step of the calibration.

Note that there exists an almost limitless number of ways to combine calibrated groups of antenna pairs, and the more effective ways exploit geometric symmetries in the circuitry of the remote retro-directive array to accomplish this task. Some exemplary patterns for combining calibrated groups of antenna pairs are discussed with reference to FIGS. 6A-6B below.

Calibration Patterns

Figure 6A:
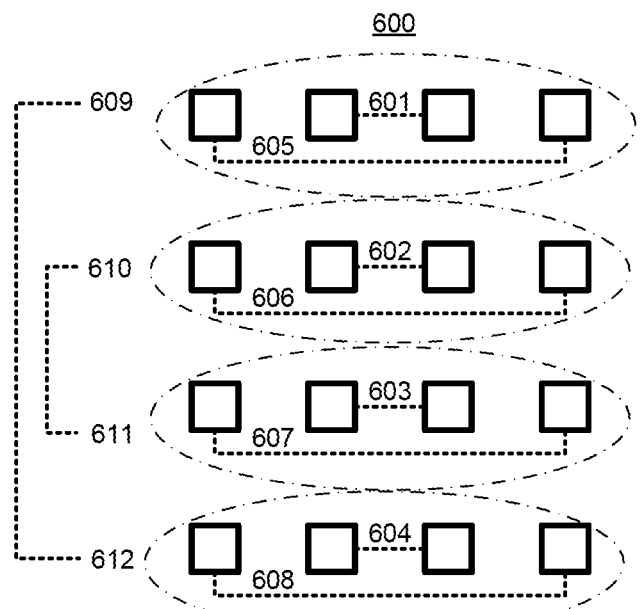
FIG. 6A presents a pattern illustrating how calibrated groups of antennas can be successively combined until all antenna pairs in the retro-directive array are calibrated in accordance with the disclosed embodiments.

FIG. 6A presents a pattern illustrating how calibrated groups of antennas in a retro-directive array 600 can be successively combined with each other until all antenna pairs in the retro-directive array are calibrated in accordance with the disclosed embodiments. In this example, interior pairs of antennas 601-604 are initially calibrated with associated exterior pairs of antennas 605-608 to form groups of two calibrated antenna pairs 609-612. Next, group (609, 612) is calibrated with group (610, 611) which covers the entire remote retro-directive array 600.

Note that groups of antenna pairs can be calibrated with each other through only a single comparison involving two antenna pairs. For example, while calibrating a first group of antenna pairs with a second group of antenna pairs, the system can calibrate a first antenna pair from the first group of antenna pairs with a second antenna pair from the second group of antenna pairs. Next, the system can adjust all of the antenna pairs in the first group of antenna pairs to match the calibration of the first antenna pair, and can adjust all of the antenna pairs in the second group of antenna pairs to match the calibration of the second antenna pair.

Figure 6B:
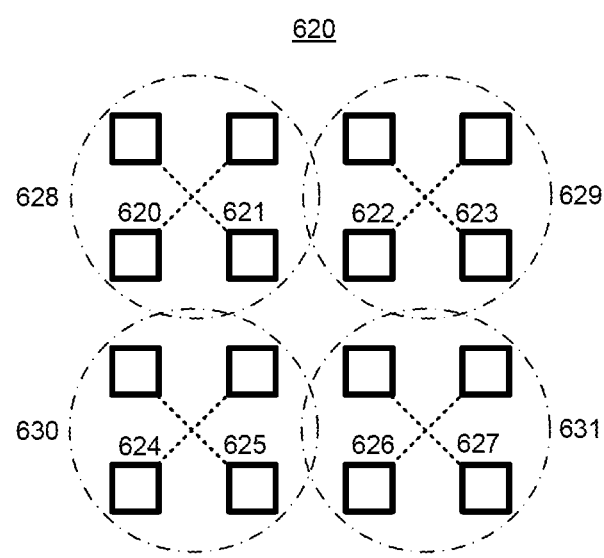
FIG. 6B illustrates an alternative pattern for combining antenna pairs in accordance with the disclosed embodiments.

FIG. 6B presents an alternative calibration pattern for groups of antenna pairs in accordance with the disclosed embodiments. In this example, the pairs are calibrated across diagonal symmetries. More specifically, antenna pair 620 is initially calibrated with antenna pair 621 to form a group of calibrated antenna pairs 629. Similarly, antenna pair 622 is initially calibrated with antenna pair 623 to form group 628, antenna pair 624 is initially calibrated with antenna pair 625 to form group 630, and antenna pair 626 is initially calibrated with antenna pair 627 to form group 631. Next, group (628, 631) is calibrated with group (629, 630), which covers the entire remote retro-directive array 620.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Calibrating the Console-Side Antenna Array

Figure 7:
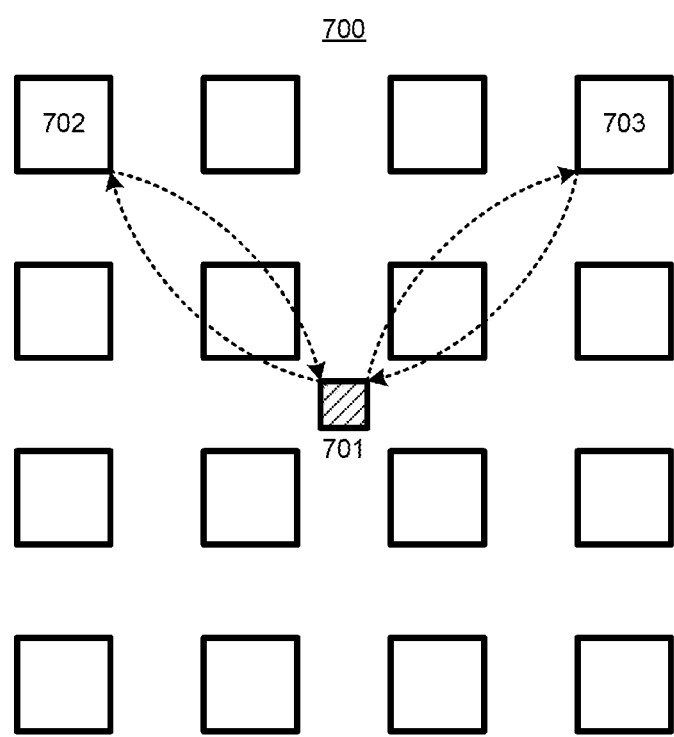
FIG. 7 illustrates the process of using a dummy antenna to calibrate a console-side antenna array in accordance with the disclosed embodiments.

FIG. 7 illustrates the process of using a dummy antenna 701 to calibrate a console-side antenna array 700 in accordance with the disclosed embodiments. As shown in FIG. 7, dummy antenna 701, which is attached to a receiver, is placed at a known location within the console array 700. During the calibration process for transmitters in the console, each antenna in array 700 (e.g., antennas 702 and 703) in turn transmits a calibration (test) signal and the dummy antenna 701 receives the signal. Note that the through-air distance between dummy antenna 701 and each antenna in array 700 can be determined by the geometry of array 700. Moreover, the delays associated with these through-air distances can be subtracted from the measured delays, and any remaining mismatch can be attributed to the transmitters. These mismatch values can subsequently be used as calibration factors for the transmitters.

Next, during the calibration process for receivers in the console, dummy antenna 701 transmits a calibration (test) signal and each antenna element and associated receiver in array 700 receives the signal. Similarly to the transmitter calibration, after subtracting the through-air delay from the measured delays, any remaining mismatches are due to the receivers' mismatches and are subsequently used as calibration factors for the receivers.

Also, the above-described methods and apparatus can be included in, but are not limited to, application-specific integrated circuit (ASIC) chips, field-programmable gate arrays (FPGAs), and other programmable-logic devices.

What is claimed is:

1. A method for calibrating a retro-directive array, comprising:

measuring a gain $g_1$ through a first pair of antennas in the retro-directive array;

measuring a gain $g_2$ through a second pair of antennas in the retro-directive array;

simultaneously measuring a combined gain $G_{1,2}$ of the first and second pairs of antennas in the retro-directive array; and if $G_{1,2}$ is less than $g_1+g_2$ by more than a threshold value, calibrating a phase relationship between the first and second pairs of antennas.

2. The method of claim 1, wherein measuring the gain $g_1$ through the first pair of antennas comprises:

activating the first pair of antennas while other antennas in the retro-directive array are inactive; and performing a loopback measurement through the first pair of antennas to determine $g_1$.

3. The method of claim 1, wherein measuring the gains $g_1$, $g_2$, and $G_{1,2}$ comprises measuring the gains $g_1$, $g_2$, and $G_{1,2}$ at more than one frequency.

4. The method of claim 1, wherein the first pair of antennas includes a first antenna and a second antenna which are coupled together through a loopback mechanism.

5. The method of claim 4, wherein the first antenna comprises a first set of antenna elements; and wherein the second antenna comprises a second set of antenna elements.

6. The method of claim 1, wherein calibrating the phase relationship between the first and second pairs of antennas comprises adjusting the phase relationship until $G_{1,2}$ moves within the threshold value of $g_1+g_2$.

7. The method of claim 1, wherein calibrating the phase relationship between the first and second pairs of antennas comprises:

calibrating delay elements associated with the first and second pairs of antennas;

calibrating phase mixers associated with the first and second pairs of antennas; or calibrating local oscillators associated with the first and second pairs of antennas.

8. The method of claim 1, wherein the first pair of antennas is in a first calibrated group of antennas, wherein antenna pairs in the first calibrated group of antennas are calibrated with each other;

wherein the second pair of antennas is in a second calibrated group of antennas, wherein antenna pairs in the second calibrated group of antennas are calibrated with each other; and wherein calibrating the phase relationship between the first and second pairs of antennas additionally comprises calibrating a phase relationship between the first and second calibrated groups of antennas to form a combined third calibrated group of antennas.

9. The method of claim 1, wherein calibrated groups of antennas are combined with each other to form larger calibrated groups of antennas until all antenna pairs in the retro-directive array are all calibrated against a common reference.

10. An apparatus for calibrating a remote retro-directive array, comprising:

a phase array configured to communicate with the remote retro-directive array; and a controller coupled to the phase array and configured to perform operations to calibrate the remote retro-directive array, wherein the operations include, measuring a gain $g_1$ through a first pair of antennas in the remote retro-directive array, measuring a gain $g_2$ through a second pair of antennas in the remote retro-directive array, simultaneously measuring a combined gain $G_{1,2}$ through the first and second pairs of antennas in the remote retro-directive array, and if $G_{1,2}$ is less than $g_1+g_2$ by more than a threshold value, calibrating a phase relationship between the first and second pairs of antennas in the remote retro-directive array.

11. The apparatus of claim 10, wherein while measuring the gain $g_1$ through the first pair of antennas, the apparatus is configured to:

send a command to activate the first pair of antennas while other antennas in the remote retro-directive array are inactive;

transmit a test signal to the remote retro-directive array;

receive an echo signal from the remote retro-directive array; and measure the echo signal to determine a loopback gain $g_1$ through the first pair of antennas.

12. The apparatus of claim 10, wherein measuring the gains $g_1$, $g_2$, and $G_{1,2}$ comprises measuring the gains $g_1$, $g_2$, and $G_{1,2}$ at more than one frequency.

13. The apparatus of claim 10, wherein calibrating the phase relationship between the first and second pairs of antennas comprises sending commands to the remote retro-directive array to adjust the phase relationship until $G_{1,2}$ moves within the threshold value of $g_1+g_2$.

14. The apparatus of claim 10, wherein calibrating the phase relationship between the first and second pairs of antennas comprises sending commands to the remote retro-directive array to:

calibrate delay elements associated with the first and second pairs of antennas;

calibrate phase mixers associated with the first and second pairs of antennas; or calibrate local oscillators associated with the first and second pairs of antennas.

15. The apparatus of claim 10, wherein the first pair of antennas is in a first calibrated group of antennas, wherein pairs of antennas in the first calibrated group of antennas are calibrated with each other;

wherein the second pair of antennas is in a second calibrated group of antennas, wherein pairs of antennas in the second calibrated group of antennas are calibrated with each other; and wherein calibrating the phase relationship between the first and second pairs of antennas additionally comprises calibrating a phase relationship between the first and second calibrated groups of antennas to form a combined third calibrated group of antennas.

16. The apparatus of claim 15, wherein calibrated groups of antennas are combined with each other to form larger calibrated groups of antennas until all pairs of the antennas in the retro-directive array are calibrated with each other.

17. A retro-directive array, comprising:

an array of antennas, wherein pairs of antennas in the array are coupled together through circuits to form a retro-directive array;

a command interface configured to receive activation commands to activate pairs of antennas in the retro-directive array; and an activation circuit, wherein in response to receiving one or more activation commands, the activation circuit is configured to activate one or more pairs of antennas in the retro-directive array, while other pairs of antennas in the retro-directive array remain inactive.

18. The retro-directive array of claim 17, wherein each pair of antennas in the retro-directive array includes a first antenna and a second antenna that are coupled together through a loopback mechanism.

19. The retro-directive array of claim 17, wherein the each antenna in the retro-directive array comprises a set of antenna elements.

* * * * *